(12) United States Patent
DuFosse (10) Patent No.: US 10,567,843 B2
(45) Date of Patent: Feb. 18, 2020

(54) SYSTEM AND METHOD FOR CREATING A REPLAY OF A LIVE VIDEO STREAM

(71) Applicant: Eric DuFosse, Flower Mound, TX (US)

(72) Inventor: Eric DuFosse, Flower Mound, TX (US)

( * ) Notice: Subject to any disclaimer, the term of this patent is extended or adjusted under 35 U.S.C. 154(b) by 220 days.

(21) Appl. No.: 16/116,692

(22) Filed: Aug. 29, 2018

(65) Prior Publication Data

US 2019/0069034 A1 Feb. 28, 2019

Related U.S. Application Data

(60) Provisional application No. 62/551,387, filed on Aug. 29, 2017.

(51) Int. Cl.
*H04N 21/2187* (2011.01)
*H04N 21/472* (2011.01)
*H04N 21/422* (2011.01)
*H04N 21/845* (2011.01)
*H04N 21/8549* (2011.01)

(52) U.S. Cl.
CPC ... *H04N 21/47205* (2013.01); *H04N 21/2187* (2013.01); *H04N 21/42204* (2013.01); *H04N 21/8456* (2013.01); *H04N 21/8549* (2013.01)

(58) Field of Classification Search
None
See application file for complete search history.

(56) References Cited

U.S. PATENT DOCUMENTS

| | | | |
|---|---|---|---|
| 5,307,456 A | 4/1994 | MacKay | |
| 6,385,386 B1 | 5/2002 | Aotake | |
| 2001/0041049 A1* | 11/2001 | Kanda | G11B 27/034 386/282 |
| 2004/0201608 A1* | 10/2004 | Ma | G06F 3/0481 715/719 |
| 2007/0022159 A1 | 1/2007 | Zhu et al. | |
| 2008/0092168 A1 | 4/2008 | Logan et al. | |
| 2011/0280540 A1* | 11/2011 | Woodman | H04N 5/765 386/201 |

(Continued)

OTHER PUBLICATIONS

Young, Lee W. Authorized Officer, ISA/US, Commissioner for Patents, "International Search Report" in connection with related International Application No. PCT/US2018/048599, dated Nov. 26, 2018, 2 pages.

(Continued)

*Primary Examiner* — Eileen M Adams
(74) *Attorney, Agent, or Firm* — Kolisch Hartwell, P.C.

(57) ABSTRACT

A video replay system includes a display device, a replay controller, a session input device, a processing circuitry and a video enabling circuitry. The session input device receives plural video streams of a broadcast event from plural video capturing devices installed at different locations of a facility hosting the broadcast event. The processing circuitry is configured for generating a user interface on the display device. The user interface includes one or more replay operator modes. The one or more replay operator modes includes plural video tracks corresponding to each of the plural video capturing devices. Each of the plural video tracks includes plural video window players. The video enabling circuitry may enable creation of at least one replay video of one or more video segments to be broadcast.

18 Claims, 9 Drawing Sheets

(56) References Cited

U.S. PATENT DOCUMENTS

2015/0043892 A1    2/2015  Groman
2015/0127626 A1    5/2015  Park et al.
2016/0286244 A1*   9/2016  Chang .............. H04N 21/21805

OTHER PUBLICATIONS

Young, Lee W. Authorized Officer, ISA/US, Commissioner for Patents, "Written Opinion of the International Searching Authority" in connection with related International Application No. PCT/US2018/048599, dated Nov. 26, 2018, 7 pages.

* cited by examiner

SYSTEM AND METHOD FOR CREATING A REPLAY OF A LIVE VIDEO STREAM

CROSS-REFERENCE TO RELATED APPLICATION

The present application claims the benefit under 35 U.S.C. § 119(e) of the following patent application, which is also hereby incorporated by reference in its entirety for all purposes: U.S. Provisional Patent Application Ser. No. 62/551,387 for a NONLINEAR MULTI-CAM REPLAY SYSTEM, filed Aug. 29, 2017.

TECHNICAL FIELD

The disclosure relates to replay generation for broadcast video. More particularly, the disclosure relates to method and system for creating a replay of a video stream of a broadcast event.

BACKGROUND

Live broadcasts of multiple events are brought to viewers on various devices through various known techniques. These techniques are known for recording video feeds of a live event from different cameras. These different cameras are usually provided at different angles in a facility hosting the live event. The video from the cameras is fed to a control room where a production crew edits the different feeds to produce a single video feed broadcast to viewers. The production crew is responsible for creating and showing a replay video of significant events taking place during the live event to viewers.

Typically, the replay video is created by a replay operator by interacting with a user interface provided on a display device. In general, the user interface includes different replay operator modes. The replay operator modes include multiple video window players. Each video window player represents a different angle of a live instance of a live broadcast event. Each of the window players corresponds to each of a video capturing device.

The replay operator modes provide a user interface to select a video segment rapidly from a live broadcast event. In addition, the replay operator modes provide a user interface to edit the video segment for which the replay operator selects and memorizes a time instance at various angle in order to create the replay video. Moreover, the replay operator modes provide a user interface for replaying the replay video at variable speed before live broadcast.

SUMMARY

In a first example, a video replay system is provided. The video replay system may include a display device, a replay controller connected to the display device, a session input device, a processing circuitry and a video enabling circuitry. The session input device may be configured for receiving plural video streams of a broadcast event from plural video capturing devices. The plural video capturing devices may be installed at different locations of a facility hosting the broadcast event.

Each of the video streams from each of the video capturing devices may provide a different angle of view of the broadcast event. The processing circuitry may be configured for generating a user interface on the display device. The user interface may include one or more replay operator modes.

Each of the one or more replay operator modes may include plural video tracks corresponding to each of the plural video capturing devices. Each of the plural video tracks may include plural video window players. Each video window player of the plural video window players may represents a time based instance associated with the broadcast event. The video enabling circuitry may be configured for enabling creation of at least one replay video of one or more video segments to be broadcast. The at least one replay video of the one or more video segments may be created by a replay operator using the one or more replay operator modes.

In a second example, a computer-implemented method for creating at least one replay video of plural video streams associated with a broadcast event is provided. The computer-implemented method may include receiving the plural video streams of the broadcast event from plural video capturing devices by a session input device.

Each video stream from each corresponding video capturing devices may provide a different angle of view of the broadcast event. In addition, the computer-implemented method may generate a user interface on a display device by a processing circuitry. The user interface may include one or more replay operator modes. Each of the one or more replay operator modes may include plural video tracks corresponding to each of the plural video capturing devices. Each of the plural video tracks may include plural video window players. Each video window player of the plural video window players may represents a time based instance associated with the broadcast event.

Further, the computer-implemented method may include enabling by a video enabling circuitry creation of the at least one replay video of one or more video segments to be broadcast. The at least one replay video of the one or more video segments may be created by a replay operator using the one or more replay operator modes.

In a third example, a non-transitory computer-readable storage medium is provided that encodes computer executable instructions which, when executed by at least one processor, perform a method that includes receiving plural video streams of the broadcast event from plural video capturing devices installed at different locations of a facility hosting the broadcast event. In addition, the method may include generating a user interface on a display device. The user interface may include one or more replay operator modes.

The one or more replay operator modes may include plural video tracks corresponding to each of the plural video capturing devices. Each of the plural video tracks may include plural video window players. Each video window player of the plural video window players may represents a time based instance associated with the broadcast event.

Further, the method may include enabling a creation of at least one replay video of one or more video segments to be broadcast. The at least one replay video of the one or more replay of the one or more video segments may be created by a replay operator using the one or more replay operator modes.

BRIEF DESCRIPTION OF THE DRAWINGS

Having thus described the invention in general terms, reference will now be made to the accompanying drawings, which are not necessarily drawn to scale, and wherein:

There may be additional structures described in the description that are not depicted in the drawings, and the absence of such depictions should not be considered as an omission of such design from the specification.

DETAILED DESCRIPTION

Before describing embodiments in detail, it should be observed that the embodiments may utilize system components and method steps related to video replay system, user interface and one or more replay operator modes. Accordingly, the system components have been represented where appropriate by conventional symbols in the drawings, showing specific details that are pertinent for an understanding of the embodiments so as not to obscure the description with details that will be readily apparent to those with ordinary skill in the art having the benefit of the description herein.

Detailed embodiments are disclosed herein; however, it is to be understood that the disclosed embodiments are merely exemplary of the claimed inventions, which can be embodied in various forms. Therefore, specific structural and functional details disclosed herein are not to be interpreted as limiting, but merely as a basis for the claims and as a representative basis for teaching one skilled in the art to variously employ the disclosed concepts in an appropriate structure or method. Further, the terms and phrases used herein are not intended to be limiting but rather to provide an understandable description of the subject matter.

Figure 1:
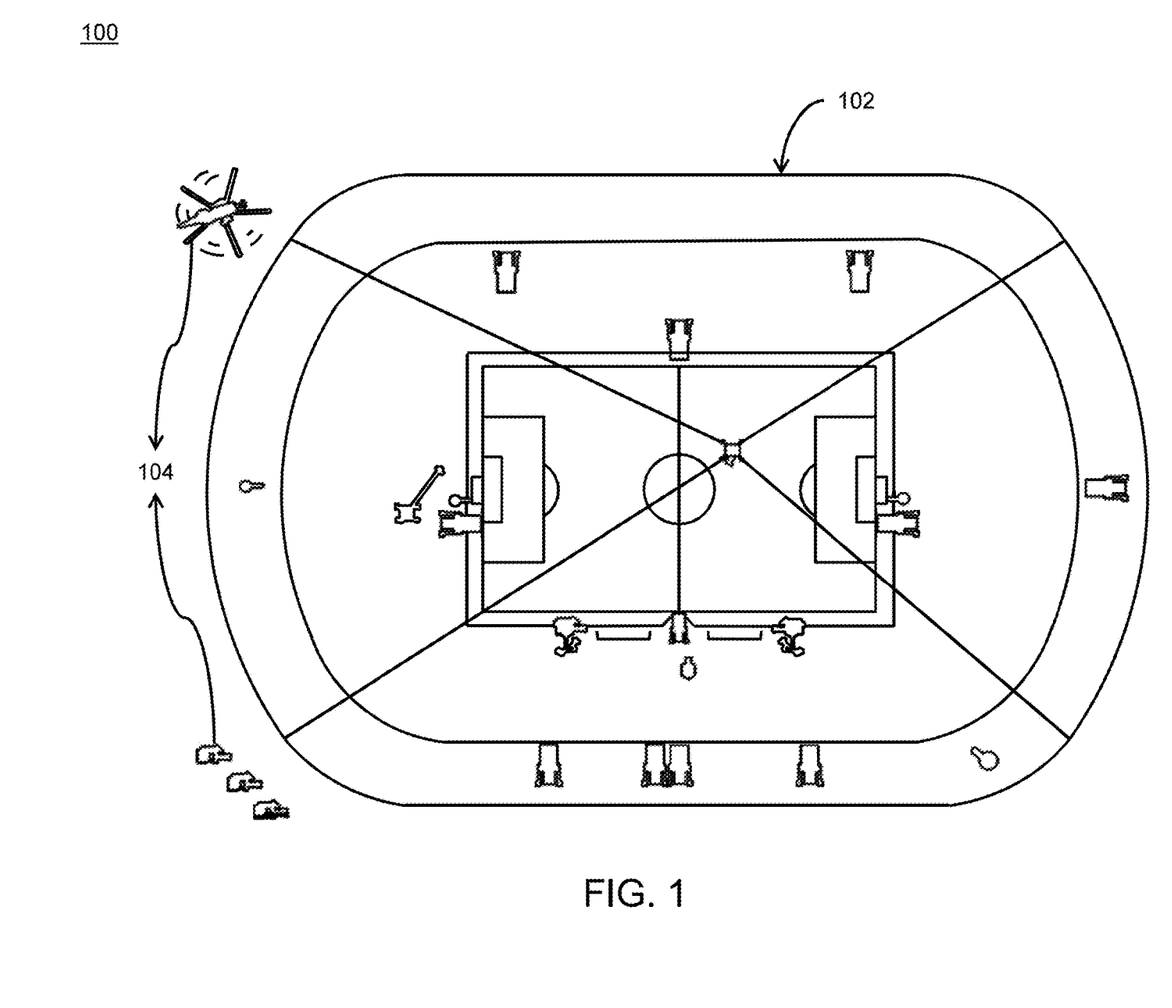
FIG. 1 illustrates an example of an environment for a broadcast event, in accordance with various embodiments of the present disclosure.

FIG. 1 illustrates an example of an interactive computing environment 100 for a broadcast event 102. In an embodiment of the present disclosure, the broadcast event includes but may not be limited to any sporting event, live news, live sitcoms and live concert. In another embodiment of the present disclosure, the broadcast event includes live telecasted event, recorded event, any recorded video, any type of video content and the like. The broadcast event 102 is broadcast for entertainment, knowledge and the like. The broadcast event 102 is broadcast by installing plural video capturing devices 104 at different locations of a facility hosting the broadcast event 102. The facility can be a place where the broadcast event 102 takes place. The facility includes but may not be limited to a playground, a news room and a studio.

In an example shown in FIG. 1, the broadcast event 102 is a football game being played on a football field. The plural video capturing devices 104 are installed at different locations in the facility for capturing the broadcast event 102 from different angles of view. The plural video capturing devices 104 are used for capturing the broadcast event 102. The plural video capturing devices 104 include but may not be limited to ultra-motion cameras, spider cam, stump cam, umpire cam, player cam, super chip camera and DSLR video camera.

Figure 2:
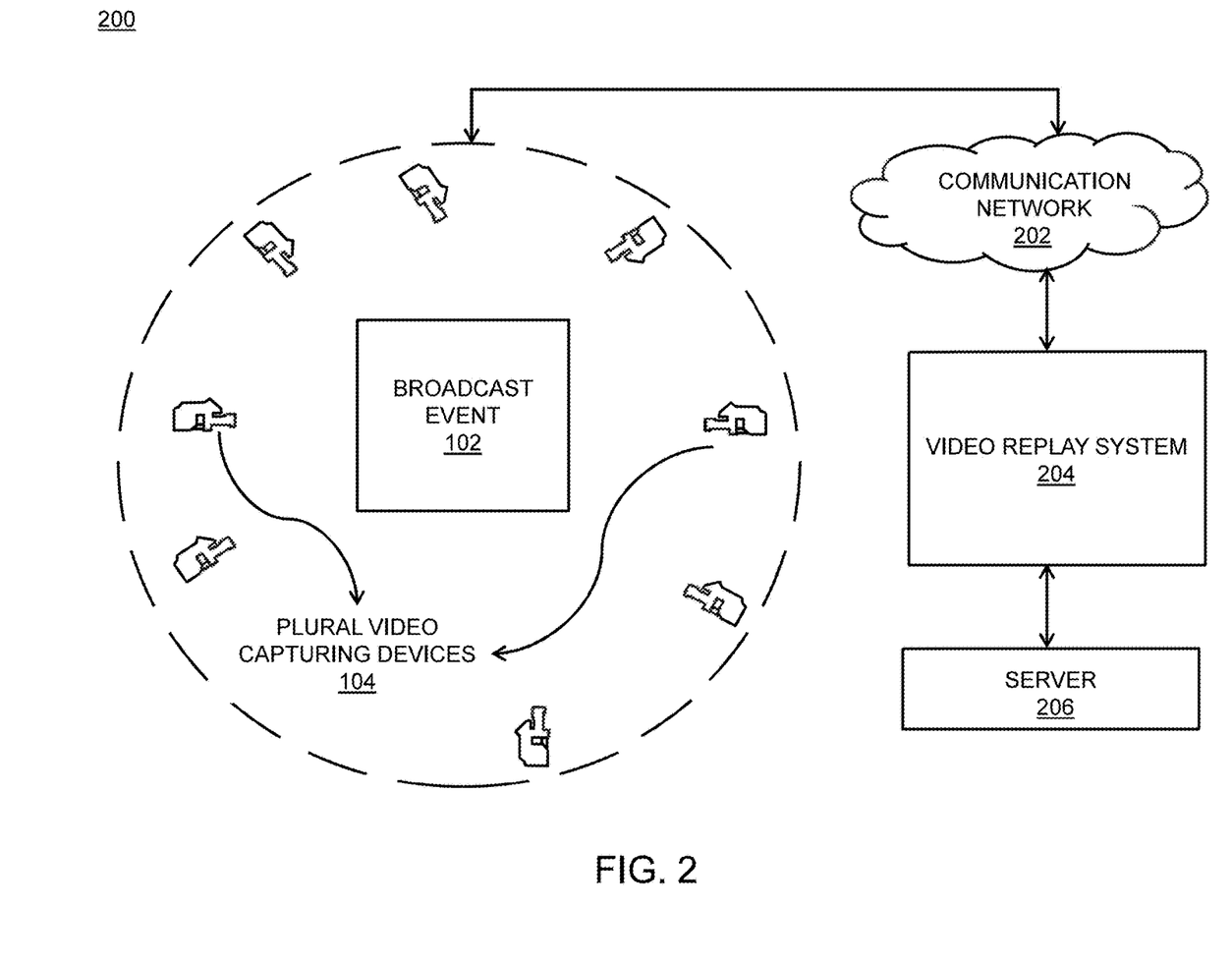
FIG. 2 illustrates an interactive computing environment for creating replay video for a broadcast event, in accordance with various embodiments of the present disclosure.

FIG. 2 illustrates an interactive computing environment 200 for creating at least one replay video for the broadcast event 102, in accordance with various embodiments of the present disclosure. The interactive computing environment 100 shows a relationship between various entities involved in creating the at least one replay video of the broadcast event 102. The interactive computing environment includes the broadcast event 102 and the plural video capturing devices 104 (as described above in the detailed description of FIG. 1). In addition, the interactive computing environment 200 includes a communication network 202, a video replay system 204 and a server 206.

The communication network 202 provides a medium to transfer plural video streams collected from the corresponding plural video capturing devices 104 to the video replay system 204. The medium for transferring the plural video streams may be wired, wireless, infrared, radio frequency (RF) and the like. The communication network 202 enables the video replay system 204 to transmit the at least one replay video created by the video replay system 204.

The interactive computing environment 200 further includes the server 206 to handle each operation and task performed by the video replay system 204. The server 206 stores one or more instructions for performing the various operations of the video replay system 204. In an embodiment, the server 206 is a cloud server which is built, hosted and delivered through a cloud computing platform. Generally, cloud computing is a process of using remote network server which are hosted on the internet to store, manage, and process data. The use of cloud server helps to access the video replay system 204 from anywhere using the Internet.

Figure 3:
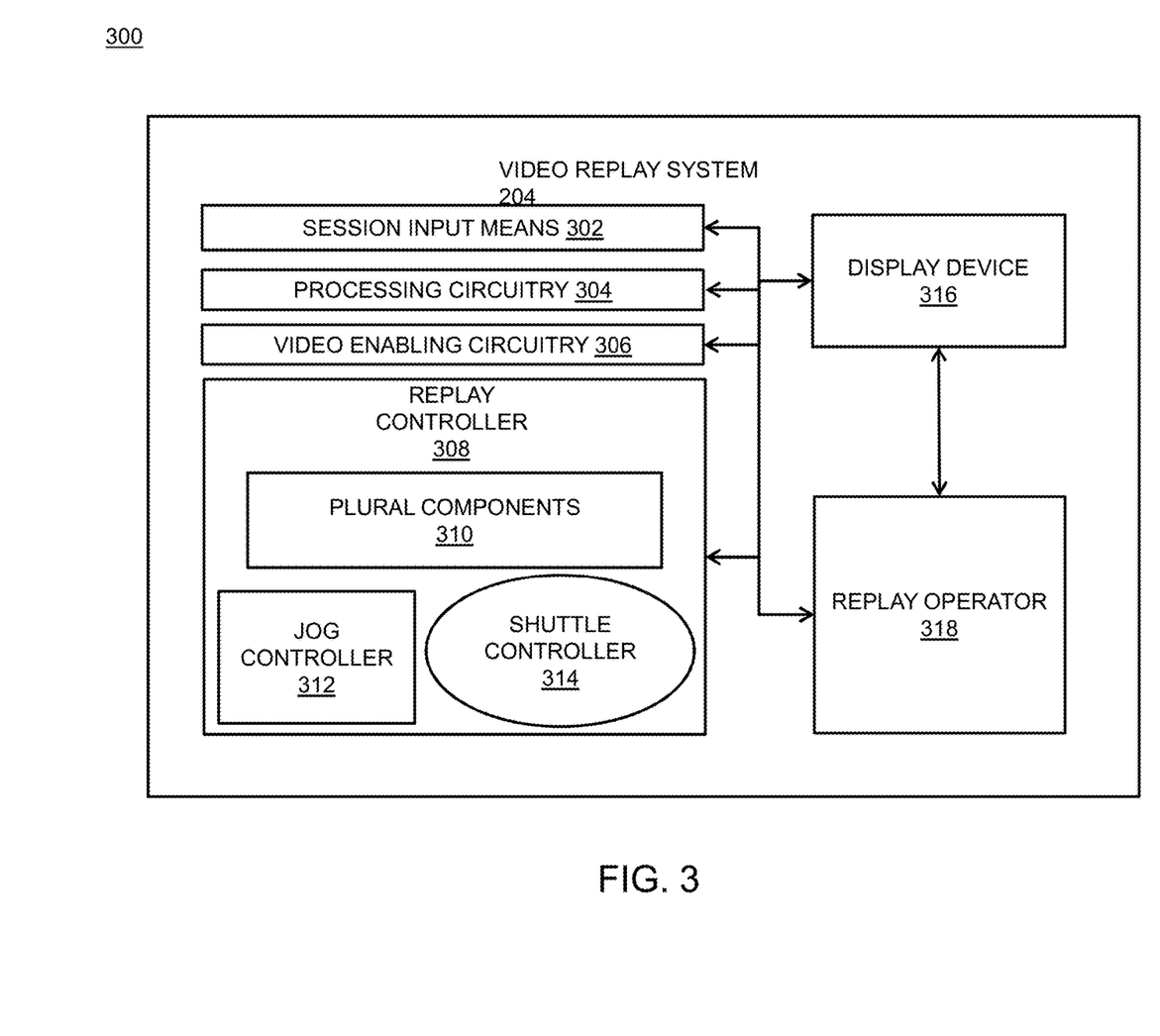
FIG. 3 illustrates a block diagram of different elements of the video replay system, in accordance with various embodiments of the present disclosure.

FIG. 3 illustrates a block diagram 300 of different elements of the video replay system 204, in accordance with various embodiments of the present disclosure. The video replay system 204 is used for creating the at least one replay video of the broadcast event 102. Typically, the replay video is a high quality video for showing any significant event which takes place during the broadcast event 102. In an example, the significant event may include a replay of a basket scored by a basketball player during a basketball game or a touchdown scored by a player in a rugby match. The video replay system 204 includes a suitable session input device 302, suitable processing circuitry 304, suitable video enabling circuitry 306, a replay controller 308, a display device 316 and a replay operator 318. In addition, the replay controller 308 comprises of plural components 310, a jog controller 312 and a shuttle controller 314.

The session input device 302 of the video replay system 204 receives the plural video streams of the broadcast event 102 through the communication network 202. The plural video streams are received from the corresponding plural video capturing devices 104. Each video stream of the plural video streams corresponds to a stream received from a corresponding video capturing device of the plural video capturing devices 104. In an embodiment, the plural video streams are high quality video streams. In another embodiment, the plural video streams are low resolution video stream of low quality. In addition, each video stream corresponds to a video feed of the broadcast event 102 from a different angle of view. Each video capturing device provides a different angle of view of the broadcast event 102 in real time. The session input device 302 sends the plural video streams to the processing circuitry 304. In an example, the plural video streams are associated with a video stream of a rugby game.

The processing circuitry 304 receives the plural video streams from the session input device 302. The processing circuitry 304 is configured to generate a user interface on the display device 316 associated with the replay operator 318. In an embodiment, the display device 316 is any device which helps to display and communicate information. Examples of the display device 316 include but may not be limited to a desktop computer, a laptop, a Smartphone and a tablet. In another example, the display device 316 includes a smart television, a workstation, an electronic wearable device and the like. The replay operator 318 is any person who is having technical knowledge of creating replay video of the broadcast event 102. The replay operator 318 has access to the video replay system 204 for making the replay video.

The processing circuitry 304 generates the user interface based on one or more replay operator modes. The user interface allows the replay operator 318 to interact with the video replay system 204 in real time for creating the at least one replay video. The one or more replay operator modes are the user interfaces to be displayed on the display device 316. Each of the one or more replay operator modes includes plural video tracks corresponding to each of the plural video capturing devices 104.

The user interface displays a first replay operator mode of the one or more replay operator modes in real time. The first replay operator mode of the one or more replay operator modes generated by the processing circuitry 304 is defined as live mode. The processing circuitry 304 generates the user interface to be displayed on the display device 316. The first replay operator mode or the live mode generated by the processing circuitry 304 includes the plural video tracks. In addition, each of the plural video tracks comprises plural video window players.

Further, each video window player of the plural video window players represents a time based instance associated with the broadcast event 102. Each video track of the plural video tracks is associated with a corresponding video capturing device of the plural video capturing devices 104. The plural video tracks are displayed on the user interface of the display device 316. The plural video tracks are represented as a matrix like display for the replay operator 318 on the display device 316. Each video track corresponds to a feed from a corresponding video capturing device from a different angle of view.

Each video window player of the plural video window players represents a time based instance associated with the broadcast event 102 based on a period scale and a frame scale. The period scale is the time based scale for showing the live instance. In an example, a first video window player from the right may represent the T0 live instance.

Further, the video window player adjacent the first video window player may represent T−10 sec instance. The period scale may be adjusted at any time by the replay operator 318. In an embodiment, the period scale is pre-defined by the replay operator 318. The frame scale is the video frame based scale for showing the live instance. In an example, the first video window player from the left may represent T−2F frame of the live instance. Further, the adjacent video window player to left of the first video window player may represent T−5F instance. The frame scale may be adjusted any time by the replay operator 318. In an embodiment, the frame scale is pre-defined by the replay operator 318.

Each video window player corresponds to the feed from each corresponding video capturing device represented through the time based instances. Each video window player represents different instances of a live event from a corresponding video capturing device. The plural video window players enable the replay operator 318 to view past instances of the broadcast event 102 in real time for a feed associated with each of the plural video capturing devices 104. Each video window player represents the feed as a combination of the period scale and the frame scale as per requirement of the replay operator 318.

A first video window player or right most video window player of the plural video window players of each of the plural video tracks represent live instance of the broadcast event 102. Each of the plural video tracks and each of the plural video window players are updated in real time based on the broadcast event 102. In addition, the first replay operator mode includes a record time indicator, a current time position indicator, a video storage indicator and a marker indicator.

In general, the record time indicator indicates a record time for which the recording has been done by the replay operator 318. In general, the current time position indicator indicates the current play position at which the video is being played. In general, the video storage indicator indicates that a video has be stored or not for the selected video content. The video storage indicator indicates storage status of the selected video. The marker is used to indicate start point and end point on the plural video tracks in order to create the at least one replay video. The marker include in marker and out marker representing the start point and the end point respectively.

The replay controller 308 is associated with the replay operator 318. The replay operator 318 interacts with each video window player of the plural video window players through the replay controller 308. The replay controller 308 is used for controlling the frame scale and the period scale. In addition, the replay controller 308 is a device used for controlling and interacting with the plural video window players. Moreover, the replay controller 308 is a tool which is used for the creation of the at least one replay video of the broadcast event 102. The replay controller 308 helps to navigate back and forth and control the speed for creating the at least one replay video of the broadcast event 102.

The replay controller 308 includes the plural components 310. The plural components include multipurpose keys, soft key and operational blocks and a small LCD. The multipurpose keys are function keys and small button for performing operations. The soft keys allow the replay operator 318 to enter various menu. In addition, the plural components 310 include operational blocks. The operational blocks include commands to perform various operation such as Mark, play, last cue, goto tc, fast jog, record, return and the like. The small LCD is used to display the command entered by the replay operator 318.

In addition, the replay controller 308 includes the jog controller 312. The jog controller 312 is a small wheel on surface of the replay controller 308 used to navigate back and forth within each video track of the plural the video tracks. Moreover, the replay controller 308 includes the shuttle controller 314. The shuttle controller 314 is a knob on a surface of the replay controller 308 used to control the speed by fast forward or rewind each video track of the plural the video tracks.

The replay operator 318 selects one or more video segments associated with the video feed of the broadcast event 102 on the user interface generated on the display device 316. The replay operator 318 selects the one or more video segments through a marker on the plural video tracks displayed in the first replay operator mode. The one or more video segments are selected by marking a start point and an end point on the plural video tracks for creating the at least one replay video. The one or more video segments selected by the replay operator 318 are provided to the video enabling circuitry 306.

The video enabling circuitry 306 enables the creation of the at least one replay video from the one or more video segments by enabling the replay operator 318 to edit the one or more video segments. In an embodiment, the video enabling circuitry 306 can be integrated with the existing replay video creation system for enabling the creation of the at least one replay video of the broadcast event 102. The processing circuitry 304 provides a second replay operator mode of the one or more replay operator modes. The second replay operator mode is displayed through the user interface generated by the processing circuitry 304. The second replay operator mode is known as an edit mode. The second replay operator mode enables the replay operator 318 to edit the one or more video segments on the display device 316. The one or more video segments are selected by the replay operator 318 in the live mode and edited in the edit mode.

The second replay operator mode or the edit mode generated by the processing circuitry 304 includes the plural video tracks. Each video track of the plural video tracks is associated with a corresponding video capturing device of the plural video capturing devices 104. Each video track includes the plural video window players similar to the plural video window players displayed in the first replay operator mode. Each of the plural video window players represent the time based instance associated with the one or more video segments based on the period scale and the frame scale. Each of the plural video window players of each of the plural video tracks is displayed in a comparable way to the adjacent video window player of each of the plural video tracks in the second replay operator mode.

The center video window player or the first video window player of the plural video window players of each of the plural video tracks in the second replay operator mode represents a cued instance of the one or more video segments selected in the first replay operator mode. Further, the plural video window players to right of the center video window player or a first side of the first video window player of the second operator mode represents a positive time instance of the one or more video segments. The positive time instance is based on the period scale and the frame scale selected by the replay operator 318. The plural video window players to the left of the center video window player or a second side of the first video window player of the second replay operator mode represents a negative time instance of the one or more video segments. The negative time instance is based on the period scale or the frame scale selected by the replay operator 318. Further, the second replay operator mode includes a record time indicator, a current time position indicator and a video storage indicator.

The replay operator 318 edits the one or more video segments in the second replay operator mode to generate the cued selected events from the one or more video segments. The replay operator 318 edits the one or more videos segments with the help of the replay controller 308. The replay operator 318 saves the sequence for the cued selected events from the plural video tracks. The replay operator 318 saves the sequence by marking a start point and an end point on the plural video tracks for the at least one replay video sequence. The at least one video sequence may include various speeds, zoom in or zoom out which are selected by the replay operator 318 using the replay controller 308 to create the high quality replay video.

The cues selected events selected by the replay operator 318 are further provided to the processing circuitry 304. The processing circuitry 304 provides a third replay operator mode of the one or more replay operator modes for playing the cued selected events on the display device 316. The processing circuitry 304 displays the third replay operator mode through the user interface on the display device 316. The third replay operator mode is known as a play mode or operator play mode. The third replay operator mode enables the replay operator 318 to play the cued selected events. The cued selected events are selected by the replay operator 318 in the edit mode and played in the play mode.

The third replay operator mode or the operator play mode generated by the processing circuitry 304 includes the plural video tracks. Each video track of the plural video tracks is associated with a corresponding video capturing device of the plural video capturing devices 104. Each video track includes the plural video window players. Each of the plural video window players represents the time based instance associated with the cued selected events based on the period scale or the frame scale.

The left most video window player of the plural video window players of each corresponding plural video tracks or a first video window player of the third replay operator mode represents a starting instance of the cued selected events. The plural video window players to the right of the left most video window player represents positive time instance of the cued selected events based on the frame scale or the period scale. Further, the third replay operator mode includes a play speed indicator, an elapsed time indicator, remaining time indicator and a video storage indicator. The play speed indicator indicates the speed of the at least one replay video. The elapsed time indicator indicates the elapsed time of the at least one replay video. The remaining time indicator indicates the remaining time of the at least one replay video.

The replay operator 318 plays the cued selected events to generate the at least one replay video. The replay operator 318 plays and edits the cued selected events with the help of the replay controller 308. The replay operator 318 saves the at least one replay video sequence from the plural video tracks by marking a start point and an end point on the plural video tracks. The at least one replay video sequence selected by the replay operator 318 is sent to a producer for further refinement.

In an embodiment, the processing circuitry 304 of the video replay system 204 provides a fourth operator mode of the one or more replay operator modes on the display device 316. The fourth operator mode may be provided to the producer for viewing the at least one replay video sequence. The fourth operator mode or producer mode is the user interface provided to the producer in order to make changes to the at least one replay video. The producer acts as the replay operator 318 to make changes to the at least one replay video sequence for refinement.

The fourth replay operator mode or the producer mode includes the plural video tracks. A first video track of the plural video tracks is associated with the at least one replay video. The first video track includes the plural video window players. Each of the plural video window players represents the time based instance associated with the cued selected events based on the period scale and the frame scale. Further, a second video track includes one video window player for a current replay video instance. Further, the fourth replay operator mode includes a third video track of the plural video tracks to represent current play position with the marker of the at least one replay video, an elapsed time indicator and a remaining time indicator.

The producer may interact with the at least one replay video in order to change sequence of the at least one replay video. The producer may mark a new start point and new end point on the at least one replay video. Accordingly, the producer may broadcast the at least one replay video based on the new start point and the new end point of the at least one replay video sequence.

In an embodiment, the video replay system 204 can be integrated with existing replay video creation system for creating the at least one replay video of the broadcast event 102.

Figure 4:
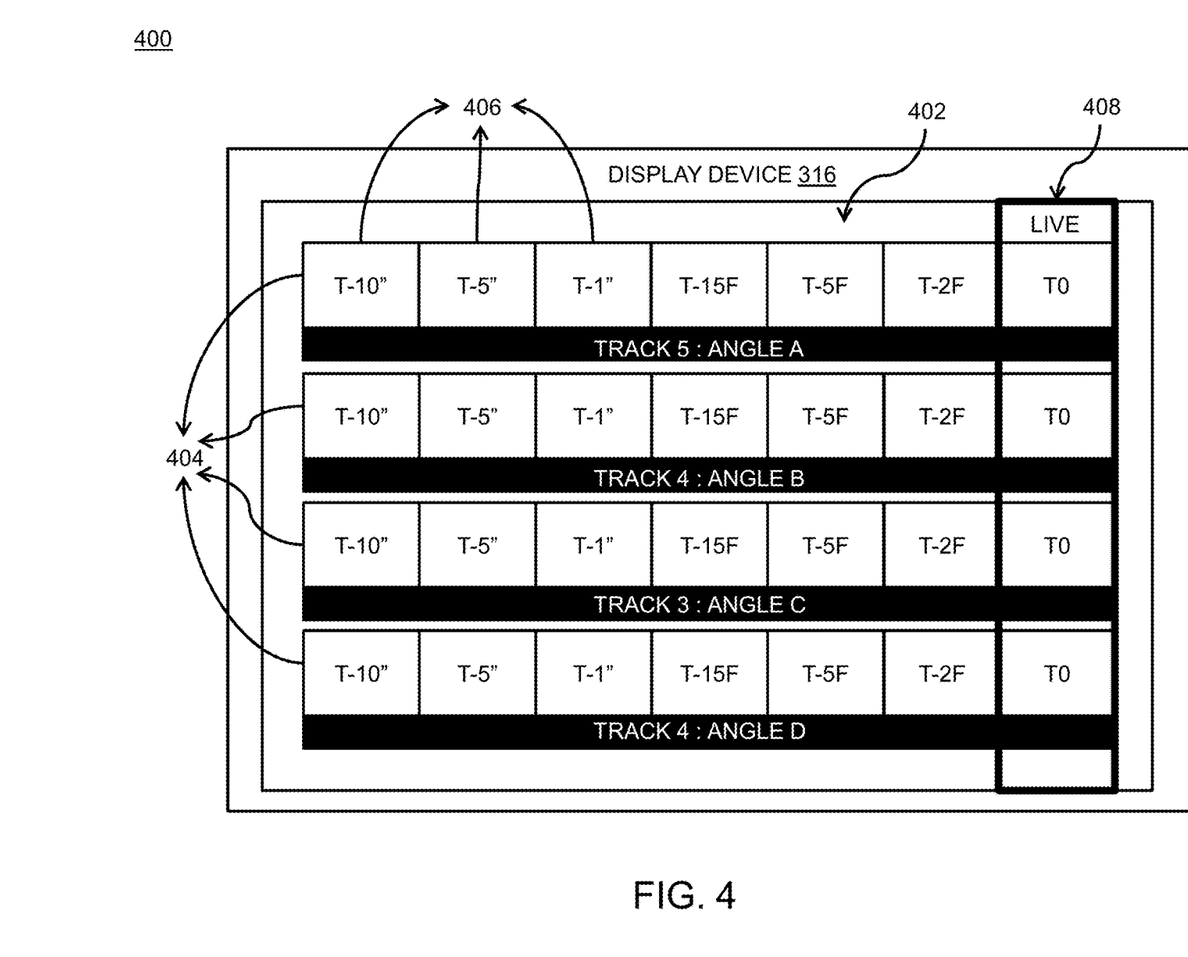
FIG. 4 illustrates an example of a user interface displaying a first replay operator mode.

FIG. 4 illustrates an example of a user interface 400 displaying the first replay operator mode 402. The first replay operator mode 402 or the live mode is displayed on the display device 316. The first replay operator mode 402 includes the plural video tracks 404. The plural video tracks 404 shown in the example of the user interface 400 include track 5 for angle A, track 4 for angle B, track 3 for angle C and track 4 for angle D. The plural video tracks 404 are associated with each of the corresponding plural video capturing devices 104. It is to be noted that the plural video tracks in the first replay operator mode 402 may be more or less as per requirement of the replay operator 318. The plural video capturing devices 104 shown in the example includes angle A video capturing device, angle B video capturing device, angle C video capturing device and angle D video capturing device.

Further, each video track includes the plural video window players 406. Each of the plural video window players 406 represents the time based instance associated with the broadcast event 102. As shown, the first video window player 408 of each of the plural video tracks 404 in the first replay operator mode 402 represents the period scale of T0. The left three video window players from the first video window player 408 of each of the plural video tracks 404 represents the frame scale based instance as T−2F, T−5F, T−15F in the same order. The three video window players from the left of each video track of the plural video tracks 404 represent the period scale based instance as T−10s, T−5s and T−15s in the same order from left.

Figure 5:
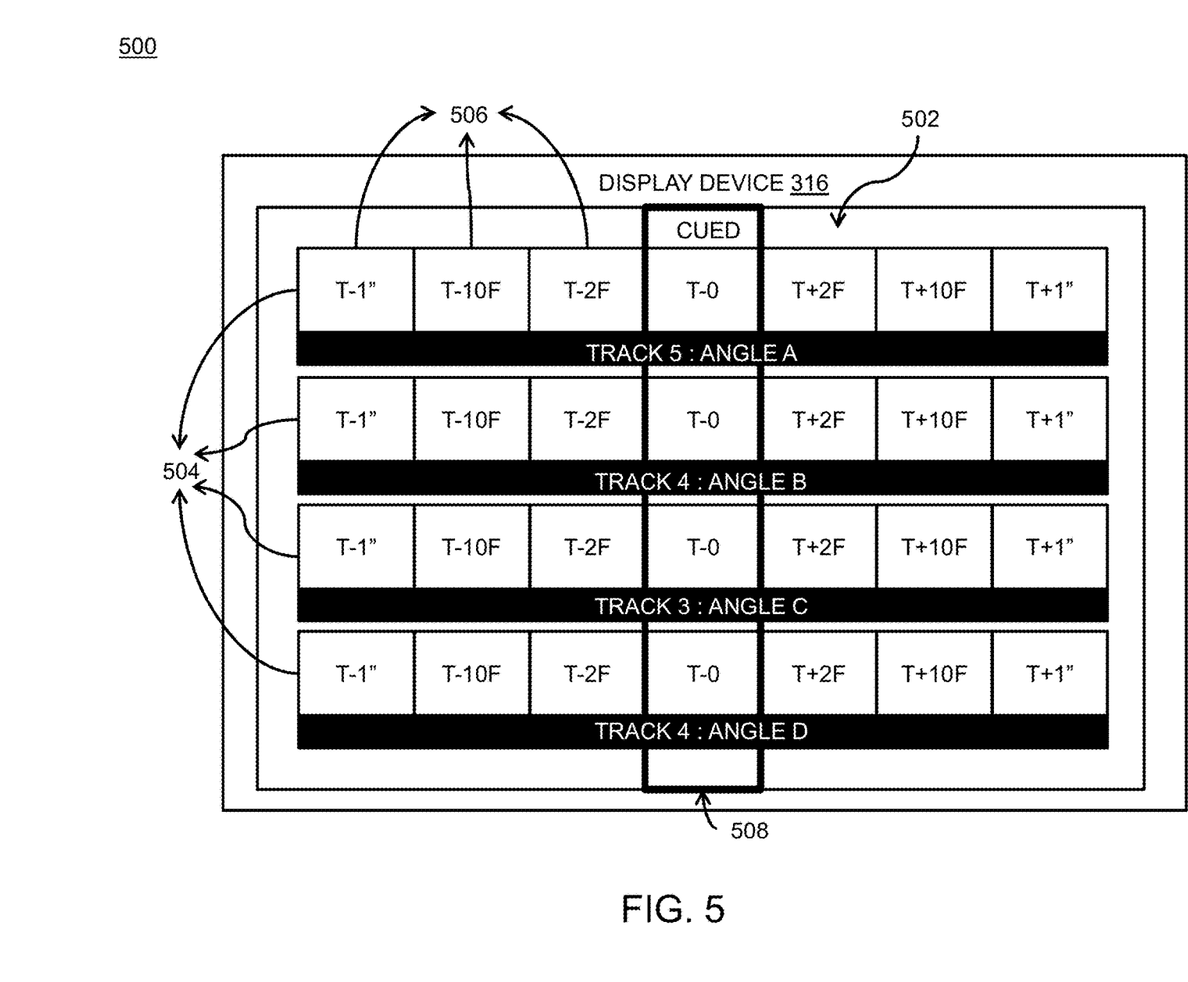
FIG. 5 illustrates an example of a user interface displaying a second replay operator mode.

FIG. 5 illustrates an example of a user interface 500 displaying the second replay operator mode 502. The second replay operator mode 502 or the edit mode is displayed on the user interface 500 on the display device 316. The second replay operator mode 502 includes the plural video tracks 504. The plural video tracks 504 shown in the example of the user interface 500 include track 5 for angle A, track 4 for angle B, track 3 for angle C and track 4 for angle D. It is to be noted that the plural video tracks in the second replay operator mode 502 may be more or less as per requirement of the replay operator 318. The plural video tracks 504 are associated with each of the corresponding plural video capturing devices 104. The plural video capturing devices 104 shown in the example includes angle A video capturing device, angle B video capturing device, angle C video capturing device and angle D video capturing device.

Further, each video track includes the plural video window players 506. Each of the plural video window players 506 represents the time based instance associated with the one or more video segments. As shown, the center video window player 508 of the plural video window players 506 of each of the plural video tracks 504 represents cued instance at the period scale T0. The cued instance of the one or more video segments is selected in the first replay operator mode 402.

The two video window players adjacent to the right of the center video window player or the first side of the center video window player of each of the plural video tracks 504 represent a positive time instance. The positive time instance of the one or more video segments is represented on the video window players by the frame scale of T+2F and T+10F in the same order. In addition, the right most video window player of the plural video window players 506 represents the positive time instance of the one or more video segments which is based on period scale of T+1s.

Further, the two video window players adjacent to the left of the center video window player 508 of each of the plural video tracks 504 represent a negative time instance. The negative time instance of the one or more video segments is based on the frame scale as T−2F and T−10F in the same order. In addition, the left most video window player of the plural video window players 506 represents the negative time instance of the one or more video segments which is based on period scale of T−1s.

Figure 6:
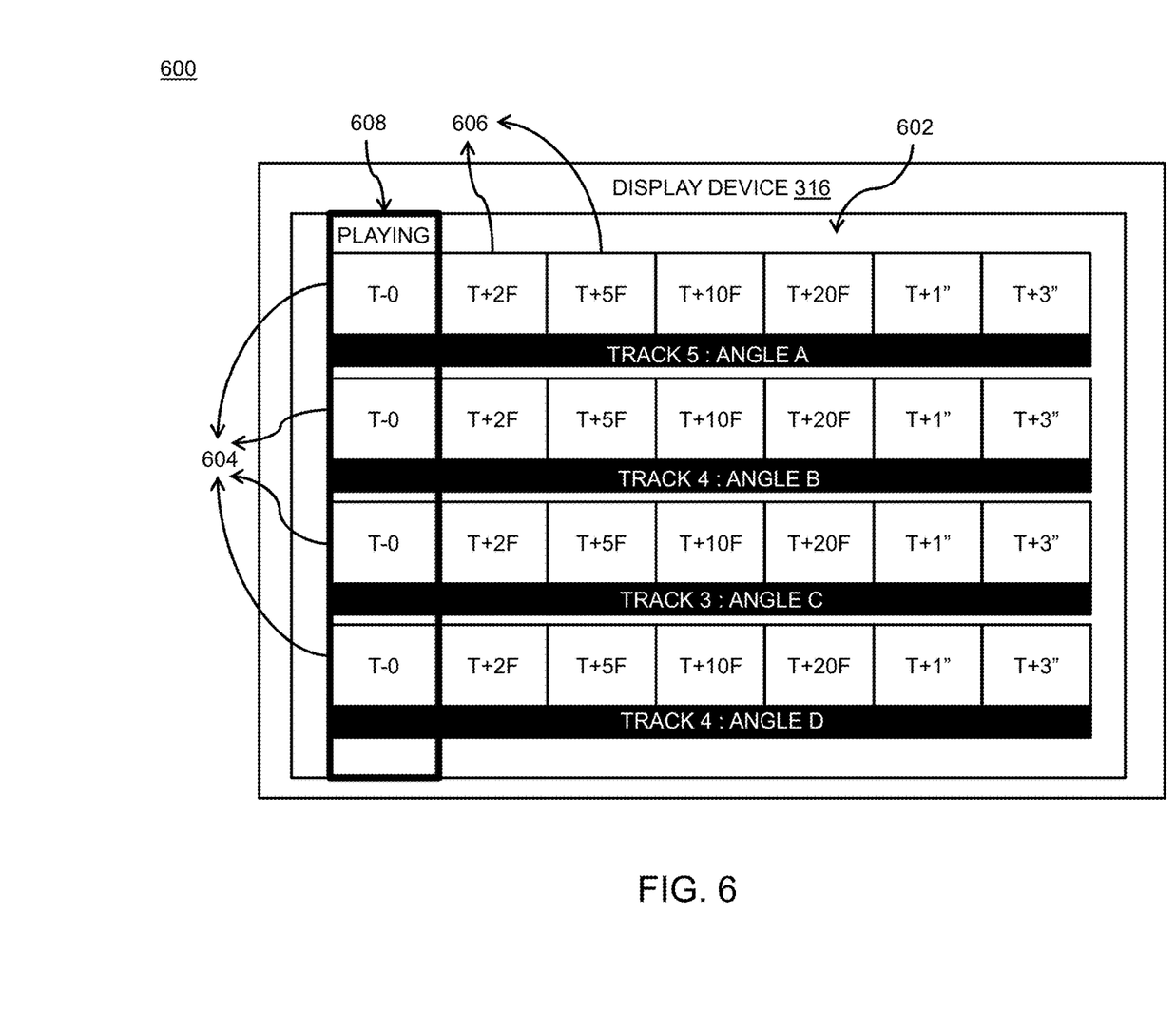
FIG. 6 illustrates an example of a user interface displaying a third replay operator mode.

FIG. 6 illustrates an example of a user interface 600 displaying the third replay operator mode 602. The third replay operator mode 602 or the operator play mode is displayed on the user interface 600 on the display device 316. The third replay operator mode 602 includes the plural video tracks 604. The plural video tracks 604 shown in the example of the user interface 600 include track 5 for angle A, track 4 for angle B, track 3 for angle C and track 4 for angle D. It is to be noted that the plural video tracks in the third replay operator mode 602 may be more or less as per requirement of the replay operator 318. The plural video tracks 604 are associated with each of the corresponding plural video capturing devices 104. The plural video capturing devices 104 shown in the example includes angle A video capturing device, angle B video capturing device, angle C video capturing device and angle D video capturing device.

Further, each video track includes the plural video window players 606. Each of the plural video window players 606 represents the time based instance associated with the cued selected events. As shown, the first video window player 608 of the third replay operator mode or the left most video window player of the plural video window players 606 of each of the plural video tracks 604 represents a starting instance of the cued selected event at T−0. The fourth video window player adjacent to the left most video window player or the first video window player 608 represents the cued selected events in positive time instance based on the frame scale as T+2F, T+5F, T+10F, T+20F. Further, the two right most video window player represents the cued selected event in positive time instance based on the period scale as T+3s and T+1s from the right corner in order.

Figure 7:
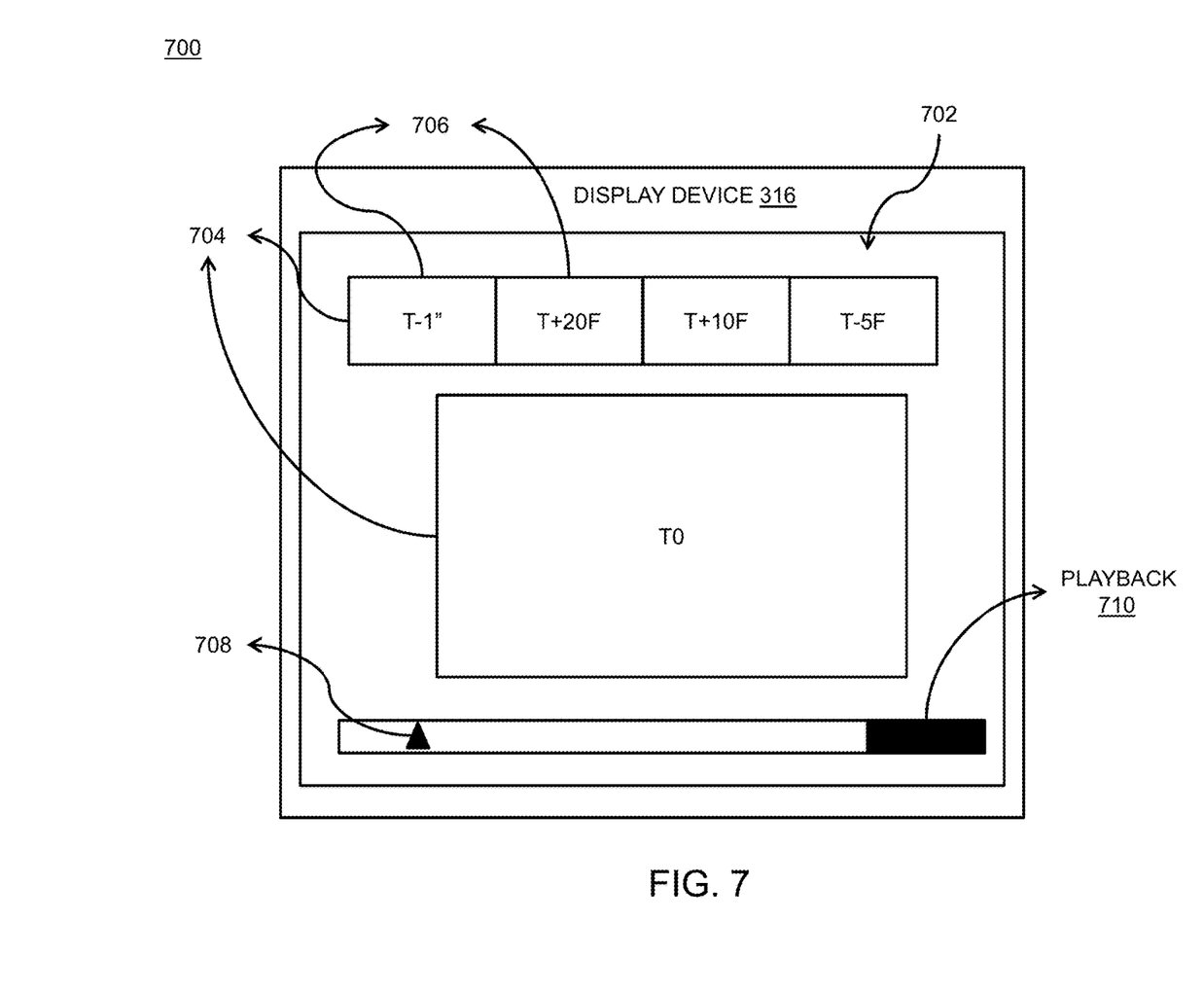
FIG. 7 illustrates an example of a fourth replay operator mode for an operator.

FIG. 7 illustrates an example of a user interface 700 displaying a fourth replay operator mode 702. The fourth replay operator mode 702 or the producer mode is displayed on the user interface 700 on the display device 316. The fourth replay operator mode 702 includes the plural video tracks 704. The first video track includes the plural video window players 706. Each of the plural video window players 706 represents the time based instance associated with the at least one replay video. The left most video window player of the plural video window players 706 represents the at least one replay video based on the period scale as T−1s. The three adjacent video window players from the left most video window players of the plural video window players 706 represent the at least one replay video based on the frame scale.

The frame scale as shown in the example include T+20F, T+10F and T−5F in the order from the left most video window player of the plural video tracks 704. In addition, the second video track includes one video window player for a current replay video instance based on the period scale as T0. Further, the fourth replay operator mode 702 includes a third video track of the plural video tracks 704 to represent current play position with a marker 708 of the at least one replay video and a playback 710 to represent the elapsed time of the at least one replay video.

Figure 8:
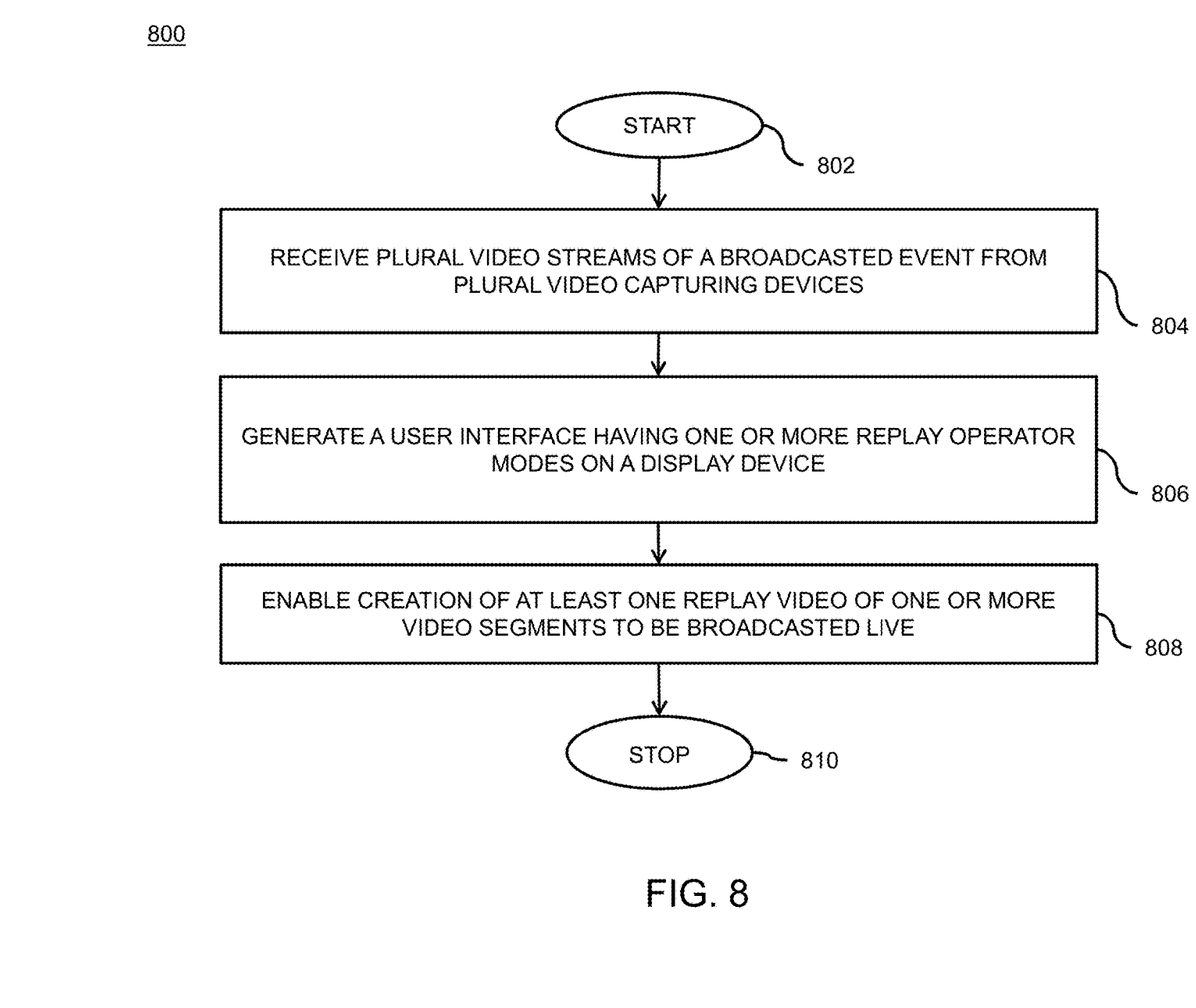
FIG. 8 illustrates a flow chart of a method for creating at least one replay video associated with a broadcast event, in accordance with various embodiments of the present disclosure.

FIG. 8 illustrates a flow chart 800 of a method for creating the at least one replay video associated with the broadcast event 102. It may be noted that in order to explain the method steps of flowchart 800, references will be made to the system elements explained in FIG. 2 and FIG. 3. It may be noted that the flowchart 800 may have less or more number of steps. The flow chart 800 starts at step 802. At step 804, the video replay system 204 receives the plural video stream of the broadcast event 102 from the plural video capturing devices 104. At step 806, the video replay system 204 generates the user interface having the one or more replay operator modes on the display device 316. At step 808, the video replay system 204 enables creation of the at least one replay video of the one or more video segments to be broadcast. The flow chart 800 terminates at step 810.

Figure 9:
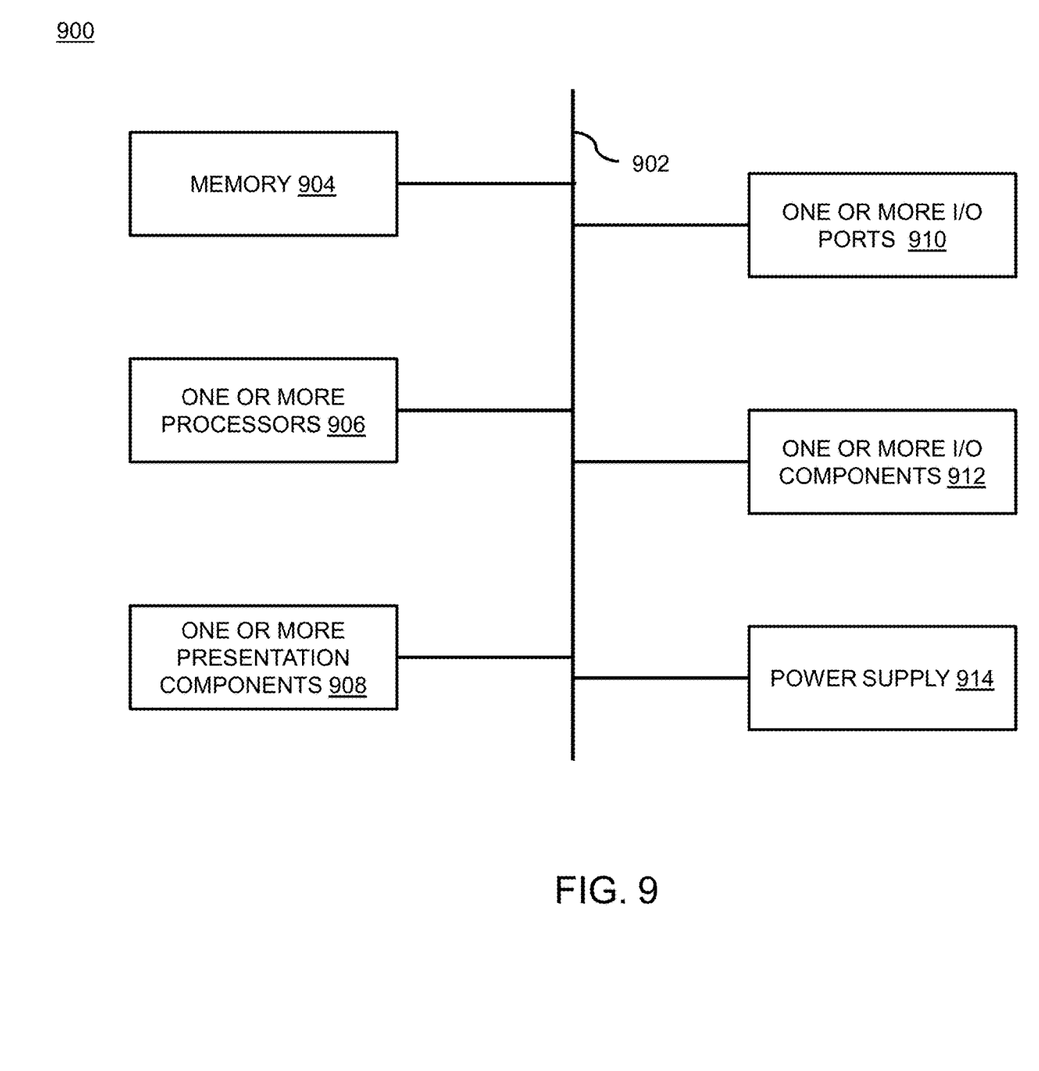
FIG. 9 illustrates a block diagram of a computing device, in accordance with various embodiments of the present disclosure.

FIG. 9 illustrates a block diagram of a computing device 900, in accordance with various embodiments of the present disclosure. The computing device 900 is associated with the video replay system 204. The computing device 900 is the display device 316. The computing device 900 is a non-transitory computer-readable storage medium that encodes computer executable instructions which, when executed by at least one processor, performs a method as described above in the application in FIG. 2 and FIG. 3. The computing device 900 includes a bus 902 that directly or indirectly couples the following devices: memory 904, one or more processors 906, one or more presentation components 908, one or more input/output (I/O) ports 910, one or more input/output components 912, and an illustrative power supply 914. The bus 902 represents what may be one or more busses (such as an address bus, data bus, or combination thereof).

Although the various blocks of FIG. 9 are shown with lines for the sake of clarity, in reality, delineating various components is not so clear, and metaphorically, the lines would more accurately be grey and fuzzy. For example, one may consider a presentation component such as a touch screen display to be an I/O component. Also, processors have memory. The inventors recognize that such is the nature of the art, and reiterate that the diagram of FIG. 9 is merely illustrative of an exemplary computing device 900 that can be used in connection with one or more embodiments of the present invention. The distinction is not made between such categories as "workstation," "server," "laptop," "hand-held device," etc., as all are contemplated within the scope of FIG. 9 and reference to "computing device."

The computing device 900 typically includes a variety of computer-readable media. The computer-readable media can be any available media that can be accessed by the computing device 900 and includes both volatile and nonvolatile media, removable and non-removable media. By way of example, and not limitation, the computer-readable media may comprise computer storage media and communication media.

The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 900.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 904 includes computer-storage media in the form of volatile and/or nonvolatile memory. The memory 904 may be removable, non-removable, or a combination thereof. Exemplary hardware devices include solid-state memory, hard drives, optical-disc drives, etc. The computing device 900 includes one or more processors that read data from various entities such as memory 904 or I/O components 912. The one or more presentation components 908 present data indications to a user or other device. Exemplary presentation components include a touch screen display, speaker, printing component, vibrating component, etc. The one or more I/O ports 910 allow the computing device 900 to be logically coupled to other devices including the one or more I/O components 912, some of which may be built in. Illustrative components include a microphone, joystick, game pad, satellite dish, scanner, printer, wireless device, etc.

From the above description, it will be appreciated that many variations are possible in the video replay system. The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

What is claimed is:

1. A video replay system comprising:
   a display device;
   a replay controller connected to the display device;

a session input device for receiving plural video streams of a broadcast event from plural video capturing devices installed at different locations of a facility hosting the broadcast event, wherein each video stream of the plural video streams from each video capturing device of the plural video capturing devices provides a video track that has a different angle of view of the broadcast event;

a processing circuitry configured for generating a user interface on the display device, wherein the user interface comprises one or more replay operator modes, wherein each of the one or more replay operator modes comprises plural video tracks corresponding to each of the plural video capturing devices, wherein each of the plural video tracks comprises plural video window players, wherein each video window player of the plural video window players represents a time based instance associated with the broadcast event;

a video enabling circuitry for enabling creation of at least one replay video of one or more video segments to be broadcast, wherein the at least one replay video of the one or more video segments is created by a replay operator using the one or more replay operator modes; and wherein the one or more replay operator modes comprises a first replay operator mode, wherein the first replay operator mode comprises the plural video tracks, wherein each of the plural video window players associated with the plural video tracks represents a time based instance associated with the broadcast event based on a period scale and a frame scale, wherein a first video window player of the plural video window players of each of the plural video tracks of the first replay operator mode represents a live instance of the broadcast event.

2. The video replay system of claim 1, wherein the one or more replay operator modes comprises a second replay operator mode, wherein the second replay operator mode comprises the plural video tracks, wherein each of the plural video window players associated with the plural video tracks represents a time based instance associated with the one or more video segments based on a period scale and a frame scale, wherein a first video window player of the plural video window players of each of the plural video tracks of the second replay operator mode represents a cued instance of the one or more video segments selected in a first replay operator mode, wherein the plural video window players on a first side of the first video window player represents a positive time instance of the one or more video segments based on the period scale and the frame scale, wherein the plural video window players on a second side of the first video window player represents a negative time instance of the one or more video segments based on the period scale and the frame scale.

3. The video replay system of claim 1, wherein the one or more replay operator modes comprises a third replay operator mode, wherein the third replay operator mode comprises the plural video tracks, wherein each of the plural video window players associated with the plural video tracks represents a time based instance associated with a cued selected events based on a period scale and a frame scale, wherein a first video window player of the plural video window players of each of the plural video tracks of the third replay operator mode represents a starting instance of the cued selected events.

4. The video replay system of claim 1, wherein the one or more replay operator modes comprises a fourth replay operator mode, wherein the fourth replay operator mode of the one or more replay operator modes is the user interface for a producer, wherein the fourth replay operator mode comprises the plural video tracks, wherein a first video track of the plural video tracks is associated with the at least one replay video, wherein the first video track comprises the plural video window players, wherein each of the plural video window players represents a time based instance associated with the at least one replay video based on a period scale and a frame scale, wherein a second video track comprises one of the plural video window players for a current replay video instance, and wherein a third video track of the plural video tracks associated with the at least one replay video represent current play position with the marker indicator of the at least one replay video.

5. The video replay system of claim 1, wherein each of a first replay operator mode and a second replay operator mode comprises:
   a record time indicator, wherein the record time indicator indicates a record time for the one or more video segments in the first replay operator mode and the record time for the cued selected event in the second replay operator mode;
   a current time position indicator, wherein the current time position indicator indicates a current play position of the broadcast event in the first replay operator mode and the current time position for the one or more video segments in the second replay operator mode; and
   a video storage indicator, wherein the video storage indicator indicates storage status of the one or more video segments in the first replay operator mode and the cued selected event in the second replay operator mode.

6. The video replay system of claim 1, wherein a third reply operator mode comprises:
   a play speed indicator, wherein the play speed indicator indicates speed of the at least one replay video;
   an elapsed time indicator, wherein the elapsed time indicator indicates the elapsed time of the at least one replay video;
   a remaining time indicator, wherein the remaining time indicator indicates the remaining time of the at least one replay video; and
   a video storage indicator, wherein the video storage indicator indicates storage status of the at least one replay video.

7. The video replay system of claim 1, wherein the replay controller is configured to control a period scale and a frame scale, wherein the reply controller comprises a jog controller and a shuttle controller.

8. The video replay system of claim 1, wherein a period scale and a frame scale is pre-defined by the replay operator.

9. The video replay system of claim 1, wherein a period scale and a frame scale is adjusted as per requirement of the replay operator.

10. A computer-implemented method for creating at least one replay video of plural video streams associated with a broadcast event, the computer-implemented method comprising:
   receiving by a session input device associated with a video replay system, the plural video streams of the broadcast event from plural video capturing devices installed at different locations of a facility hosting the broadcast event, wherein each of the video stream of the plural video streams from each of the video capturing devices of the plural video capturing devices provides a video track that has a different angle of view of the broadcast event;

generating by a processing circuitry associated with the video replay system, a user interface on a display device, wherein the user interface comprises one or more replay operator modes, wherein each of the one or more replay operator modes comprises plural video tracks corresponding to each of the plural video capturing devices, wherein each of the plural video tracks comprises plural video window players, wherein each video window player of the plural video window players represents a time based instance associated with the broadcast event;

enabling by a video enabling circuitry associated with the video replay system, creation of at least one replay video of one or more video segments to be broadcast, wherein the at least one replay video of the one or more video segments is created by a replay operator using the one or more replay operator modes; and wherein the one or more replay operator modes comprises a first replay operator mode, wherein the first replay operator mode comprises the plural video tracks, wherein each of the plural video window players associated with the plural video tracks represents a time based instance associated with the broadcast event based on a period scale and a frame scale, wherein a first video window player of the plural video window players of each of the plural video tracks of the first replay operator mode represents a live instance of the broadcast event.

11. The computer-implemented method of claim 10, wherein the one or more replay operator modes comprises a second replay operator mode, wherein the second replay operator mode comprises the plural video tracks, wherein each of the plural video window players associated with the plural video tracks represents a time based instance associated with the one or more video segments based on a period scale and a frame scale, wherein a first video window player of the plural video window players of each of the plural video tracks of the second replay operator mode represents a cued instance of one or more video segments selected in a first replay operator mode, wherein the plural video window players on a first side of the first video window player represents a positive time instance of the one or more video segments based on the period scale and the frame scale, wherein the plural video window players on a second side of the first video window player represents a negative time instance of the one or more video segments based on the period scale and the frame scale.

12. The computer-implemented method of claim 10, wherein the one or more replay operator modes comprises a third replay operator mode, wherein the third replay operator mode comprises the plural video tracks, wherein each of the plural video window players associated with the plural video tracks represents a time based instance associated with a cued selected events based on a period scale and a frame scale, wherein a first video window player of the plural video window players of each of the plural video tracks of the third replay operator mode represents a starting instance of the cued selected events.

13. The computer-implemented method of claim 10, wherein the one or more replay operator modes comprises a fourth replay operator mode, wherein the fourth replay operator mode of the one or more replay operator modes is the user interface for a producer, wherein the fourth replay operator mode comprises the plural video tracks, wherein a first video track of the plural video tracks is associated with the at least one replay video, wherein the first video track comprises the plural video window players, wherein each of the plural video window players represents a time based instance associated with the at least one replay video based on a period scale and a frame scale, wherein a second video track comprises one of the plural video window players for a current replay video instance, and wherein a third video track of the plural video tracks associated with the at least one replay video represent current play position with the marker indicator of the at least one replay video.

14. The computer-implemented method of claim 10, wherein each of a first replay operator mode and a second replay operator mode comprises:

a record time indicator, wherein the record time indicator indicates a record time for the one or more video segments in the first replay operator mode and the record time for the cued selected event in the second replay operator mode;

a current time position indicator, wherein the current time position indicator indicates a current play position of the broadcast event in the first replay operator mode and the current time position for the one or more video segments in the second replay operator mode; and a video storage indicator, wherein the video storage indicator indicates storage status of the one or more video segments in the first replay operator mode and the cued selected event in the second replay operator mode.

15. The computer-implemented method of claim 10, wherein a third reply operator mode comprises:

a play speed indicator, wherein the play speed indicator indicates speed of the at least one replay video;

an elapsed time indicator, wherein the elapsed time indicator indicates the elapsed time of the at least one replay video;

a remaining time indicator, wherein the remaining time indicator indicates the remaining time of the at least one replay video; and a video storage indicator, wherein the video storage indicator indicates storage status of the at least one replay video.

16. The computer-implemented method of claim 10, wherein the replay controller is configured to control a period scale and a frame scale, wherein the reply controller comprises a jog controller and a shuttle controller.

17. The computer-implemented method of claim 10, wherein a period scale and a frame scale is pre-defined by the replay operator.

18. The computer-implemented method of claim 10, wherein a period scale and a frame scale is adjusted as per requirement of the replay operator.

* * * * *